(12) United States Patent
Salminen et al.

(10) Patent No.: US 9,586,764 B2
(45) Date of Patent: Mar. 7, 2017

(54) MINERAL MATERIAL PROCESSING PLANT AND A METHOD FOR OPERATING A PROCESSING PLANT

(71) Applicant: Metso Minerals, Inc., Helsinki (FI)

(72) Inventors: Vesa-Matti Salminen, Kangasala (FI); Iiro Nikkila, Lempaala (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 14/237,411

(22) PCT Filed: Sep. 4, 2013

(86) PCT No.: PCT/FI2013/050853
§ 371 (c)(1),
(2) Date: Feb. 6, 2014

(87) PCT Pub. No.: WO2015/033011
PCT Pub. Date: Mar. 12, 2015

(65) Prior Publication Data
US 2016/0176647 A1    Jun. 23, 2016

(51) Int. Cl.
*B02C 21/02* (2006.01)
*B65G 41/00* (2006.01)
*B07B 1/00* (2006.01)
*B65G 21/12* (2006.01)

(52) U.S. Cl.
CPC ............ *B65G 41/002* (2013.01); *B02C 21/02* (2013.01); *B07B 1/005* (2013.01); *B65G 21/12* (2013.01)

(58) Field of Classification Search
CPC ....... B02C 21/02; B02C 21/026; B02C 23/08; B07B 1/00; B65G 41/00

USPC ................................. 241/101.74–101.742
See application file for complete search history.

(56) References Cited

U.S. PATENT DOCUMENTS

| | | | |
|---|---|---|---|
| 3,203,632 | A | 8/1965 | Poynter |
| 6,065,606 | A | 5/2000 | Bonner |
| 2004/0182758 | A1 | 9/2004 | MCloskey |
| 2011/0192769 | A1 | 8/2011 | Garland |

FOREIGN PATENT DOCUMENTS

| | | |
|---|---|---|
| WO | 95/12462 A1 | 5/1995 |
| WO | 02/26403 A1 | 4/2002 |
| WO | 2007093645 A2 | 8/2007 |

(Continued)

OTHER PUBLICATIONS

PCT International Search Report dated Oct. 7, 2014.

(Continued)

*Primary Examiner* — Mark Rosenbaum
(74) *Attorney, Agent, or Firm* — Andrus Intellectual Property Law, LLP

(57) ABSTRACT

A mineral material processing plant includes a frame and a screen which is supported on the frame of the processing plant, and a conveyor which is fixed in connection with the screen for transporting material to be processed by the screen. The support of the conveyor relative to the screen includes a four-bar linkage mechanism, and pivot points of the four-bar linkage mechanism are arranged in support arms which are fixed pivotably in connection with the screen, and the conveyor is arranged to be moved further from the screen and closer to the screen by the movement of the four-bar linkage. A method for operating a processing plant is also disclosed.

20 Claims, 3 Drawing Sheets

(56) References Cited

FOREIGN PATENT DOCUMENTS

WO      2008129287 A2    10/2008
WO      2012160152 A1    11/2012

OTHER PUBLICATIONS

"Nordberg NW Series Portable Plants for Closed Circuit Crushing", Brochure No. 1415-03-03-SAM/Sorocaba-English, 2008, Metso Minerals.

MINERAL MATERIAL PROCESSING PLANT AND A METHOD FOR OPERATING A PROCESSING PLANT

CROSS-REFERENCE TO RELATED APPLICATIONS

This application claims priority to PCT/FI2013/050853, filed Sep. 4, 2013, and published in English on Mar. 12, 2015 as publication number WO2015/033011, incorporated herein by reference.

TECHNICAL FIELD

The invention relates to mineral material processing. The invention relates particularly, though not exclusively, to conveyor solutions in a mineral material processing plant.

BACKGROUND ART

Mineral material, for example rock, is gained from the earth for crushing by exploding or excavating. The rock can also be natural rock and gravel or construction waste. Mobile crushers and stationary crushing applications are used in crushing. An excavator or wheeled loader loads the material to be crushed into the crusher's feed hopper from where the material to be crushed may fall in a jaw of a crusher or a feeder moves the rock material towards the crusher. The material to be crushed may also be recyclable material such as concrete, bricks, or asphalt.

A conveyor often increases the length, width and/or height of the plant in a movable mineral material processing plant. Therefore the conveyor may be positioned in another location during operation than during transport or service of the plant. Moving the conveyor from the operation position of the plant to the transport or service position of the plant requires in some cases detaching of the conveyor from place. Additionally the conveyor is fixed to the plant for the transport. In many cases the entire conveyor must be moved from its location, for example in order to keep the conveyor inside transport dimensions (height, width, length) which are allowed or require a permission in road traffic.

In some known mineral material processing plants a crusher/screen is fed by a single part conveyor which is moved to a transport/service position by moving the conveyor towards a feeding end and downwards. A known screen is supported by telescopic operating legs on a frame of a processing plant. Another known screen is supported to the frame of the processing plant by pivoted legs which together with the screen and the frame form a four-bar linkage.

Moving mechanisms used for the moving of the conveyor are heavy and expensive constructions. The moving of the conveyor away from the crusher requires space at the feeding end of the plant which may be problematic if the plant in question is a mobile crushing plant which is operating in a process of several plants and a feeding plant is close to a receiving plant. The feeding plant must then be moved before service of the receiving plant. Sliding mechanisms and telescopic operating legs are used for longitudinal moving of the conveyor in the plant. The sliding mechanisms tolerate poorly dirty circumstances and are sensitive with respect to production inaccuracy.

In a known movable crushing and screening plant the material which is crushed in a crusher is circulated by conveyors in a closed loop from the crusher to a screen. The overs of the screen is guided to the crusher. The product passing through the screen can be guided to further processing in the same plant or another plant which processes mineral material, or to a pile. A long single part conveyor is used in this closed loop plant for feeding the screen which conveyor is moved to a transport position by cylinder operations. The long conveyor which is feeding the screen is at side of the crusher what increases transport width and causes that when the screen is fed the material has to be moved sideways from a main conveyor to a feed conveyor for example by a vibration chute or hopper. Then the process includes an extra wearing part (vibration chute, hopper) and the material arrives to the screen from a side direction wherein spreading of the material evenly on the screen is problematic. Alternatively the plant must include an expensive, heavy, and often unreliable moving mechanism by which the conveyor can be moved off the crusher for transport and service of the crusher.

An object of the invention is to avoid or at least reduce problems present in connection with prior art. An object of the invention is to provide new technical alternatives. An object of the invention is to enhance serviceability of a mineral material processing plant. An object of the invention is to enhance operation reliability, usability and transportability of a mineral material processing plant. An object of the invention is to simplify a mineral material processing plant. An object of the invention is to enhance processing of mineral material.

SUMMARY

According to a first aspect of the invention there is provided a mineral material processing plant which comprises a frame and a screen which is supported on the frame of the processing plant, and a conveyor which is fixed in connection with the screen for transporting material to be processed by the screen, and the support of the conveyor relative to the screen comprises a four-bar linkage mechanism, and pivot points of the four-bar linkage mechanism are arranged in support arms which are fixed pivotably in connection with the screen, and the conveyor is arranged to be moved farther from the screen and closer to the screen by the movement of the four-bar linkage.

Preferably the processing plant comprises a conveyor above the screen, the support of which conveyor comprises a third support arm and a fourth support arm which support arms are fixed at a distance from each other and pivotably at third pivot points in connection with the conveyor above the screen and pivotably at fourth pivot points in connection with the screen, forming a movable second four-bar linkage mechanism.

Preferably the support of the screen on the frame of the processing plant comprises a first support arm and a second support arm which support arms are fixed at a distance from each other and pivotably at first pivot points in connection with the screen and pivotably at second pivot points in connection with the frame, forming a movable first four-bar linkage mechanism.

Preferably the processing plant comprises a discharge conveyor below the screen which discharge conveyor is supported at its first end in connection with the screen; and the discharge conveyor comprises a conveyor pivot at the centre region of the screen or at said first end; and the discharge conveyor is supported at the conveyor pivot in connection with the screen; and the discharge conveyor comprises a discharge end which is pivotable around the conveyor pivot closer to and farther from the screen, and the discharge end is arranged to move farther from the screen and closer to the screen through a support structure which is formed to the support arm of the first four-bar linkage mechanism.

Preferably the four-bar linkage mechanism further comprises a controllable actuator which is configured to decrease an area formed by the pivot points of the four-bar linkage mechanism therebetween to move the conveyor closer to the screen and to increase the area formed by the pivot points therebetween to move said conveyor farther from the screen.

Preferably the location of the conveyor in the position closest to the screen, provided by the movement of the four-bar linkage mechanism, is a transport position of the conveyor.

Preferably the first four-bar linkage mechanism comprises as a locking an adjustable reaction bar, such as a turnbuckle, which is mounted between the support arm and the frame in an upper position of the first four-bar linkage.

Preferably the second four-bar linkage mechanism comprises as a locking a pin-hole-combination where the pin is mountable in holes which are formed to the support arm and a sub-frame which is operating as a fixing base of the screen.

Preferably the support of the conveyor above the screen comprises a four-bar linkage mechanism at both longitudinal sides of the screen and a controllable actuator belonging to said four-bar linkage mechanism such as an expandable and retractable hydraulic cylinder.

Preferably the processing plant further comprises a crusher and a first conveyor, and the conveyor above the screen is feedable above the crusher by the first conveyor.

Preferably the conveyor arranged above the screen is arranged to move in the longitudinal direction of the screen by the movement of the four-bar linkage mechanism.

Preferably the processing plant is configured to feed the crusher by the first conveyor when the conveyor above the screen is moved in the longitudinal direction of the screen away from a feed connection of the first conveyor.

Preferably the crusher comprises a feed hopper of the crusher which feed hopper comprises an open pivotable side, and a discharge end of the first conveyor is located in a transport position in between sides of the feed hopper via the open pivotable side.

According to a second aspect of the invention there is provided a method for operating a mineral material processing plant which processing plant comprises a frame and a screen which is supported on the frame of the processing plant, and a conveyor which is fixed in connection with the screen for transporting material to be processed by the screen; and the support of the conveyor relative to the screen comprises a four-bar linkage mechanism, and pivot points of the four-bar linkage mechanism are arranged in support arms which are fixed pivotably in connection with the screen, and moving the conveyor farther from the screen and closer to the screen by the movement of the four-bar linkage.

Preferably the four-bar linkage further comprises a controllable actuator, and decreasing by the controllable actuator an area formed by the pivot points of the four-bar linkage mechanism therebetween wherein the conveyor moves closer to the screen to a transport position; and increasing by the controllable actuator the area formed by the pivot points therebetween wherein said conveyor moves farther from the screen to an operation position.

Preferably the processing plant further comprises a crusher and a first conveyor, and feeding, above the crusher, the conveyor above the screen by the first conveyor.

Preferably moving the conveyor arranged above the screen in the longitudinal direction of the screen by moving a four-bar linkage mechanism.

Preferably moving the conveyor arranged above the screen in the longitudinal direction of the screen away from a feed connection of the first conveyor, and feeding the crusher by the first conveyor.

Preferably the crusher is any of the following: a jaw crusher, a horizontal shaft impactor, a vertical shaft impactor, a gyratory crusher, a cone crusher.

Preferably the mineral material processing plant is a movable processing plant such as a movable screening and crushing plant.

The conveyor located above (correspondingly below) the screen must not necessarily be dismounted in order to arrive at the transport height but this conveyor can, without dismounting, be moved towards an uppermost (correspondingly a lowermost) screen deck. In some cases the conveyor can be placed in between sides located at sides of the screen, below (correspondingly above) the highest (correspondingly lowest) height of the sides.

Replacement of uppermost and lowermost screen meshes gets easier when the conveyor can be moved vertically farther in relation to the screen and the screen mesh. The transport position is compact when the conveyor can be placed as close as possible to the screen mesh wherein a space reservation required by the conveyor can be minimized. Space reservation between the crusher and the screen, and between the screen and a mobile apparatus is gotten as large as possible for maintenance wherein the operator need not work in narrow working circumstances.

The longitudinally and centrally above the screen mountable conveyor does not need a separate wearing discharge hopper for discharging material onto the screen, and the discharge point sets at a desired point at the centre line of the screen.

An underflow conveyor below the screen, called in this description also the discharge conveyor, preferably comprises a conveyor pivot, and by using this conveyor pivot pivoting the end of the underflow conveyor in a transport position (transport height) against an underside of the screen is enabled without moving from place or dismounting this conveyor.

Preferably the first conveyor operated to feed the process comprises a pivot, and by using this pivot pivoting the end of the conveyor in a transport position (transport height) is enabled without moving from place or dismounting the entire conveyor.

Taking advantage of the pivot the end of the conveyor can be pivoted upwards which allows a better maintenance space around and above the crusher, for example for using a lifting apparatus when replacing wear parts.

The crusher can be fed directly by the first conveyor or, depending on the plant, for example by a second conveyor which in turn feeds for example a screen.

Expensive and inconvenient mechanisms intended to move the conveyor are left away from the construction. Anyway, one does not need to compromise the service space above the crusher.

The same first conveyor can be used both in plants with and without a screen.

The transport length and/or transport height of the plant can be decreased and putting into the transport state is speeded up when the first conveyor and/or the second conveyor do not need to be detached from place.

Different embodiments of the present invention will be illustrated or have been illustrated only in connection with some aspects of the invention. A skilled person appreciates that any embodiment of an aspect of the invention may apply to the same aspect of the invention and other aspects alone or in combination with other embodiments as well.

BRIEF DESCRIPTION OF THE DRAWINGS

The invention will be described, by way of example, with reference to the accompanying drawings.

DETAILED DESCRIPTION

In the following description, like numbers denote like elements. It should be appreciated that the illustrated drawings are not entirely in scale, and that the drawings mainly serve the purpose of illustrating some example embodiments of the invention.

Figure 1:
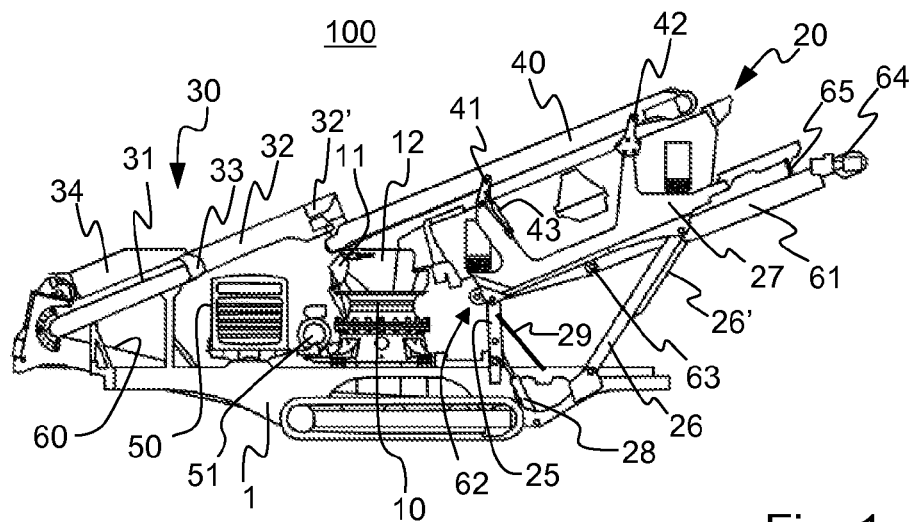
FIG. 1 shows a mineral material processing plant according to a first preferable embodiment of the invention in a screening and crushing position.
Figure 2:
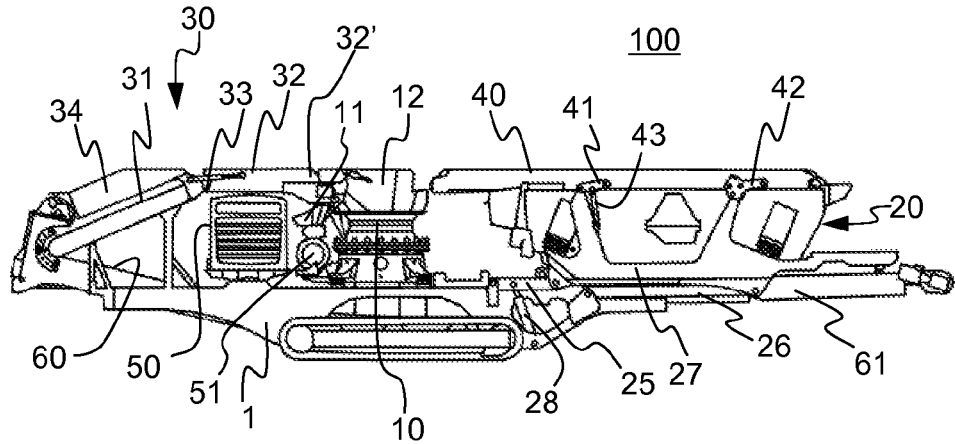
FIG. 2 shows the processing plant of FIG. 1 in a transport position.
Figure 3:
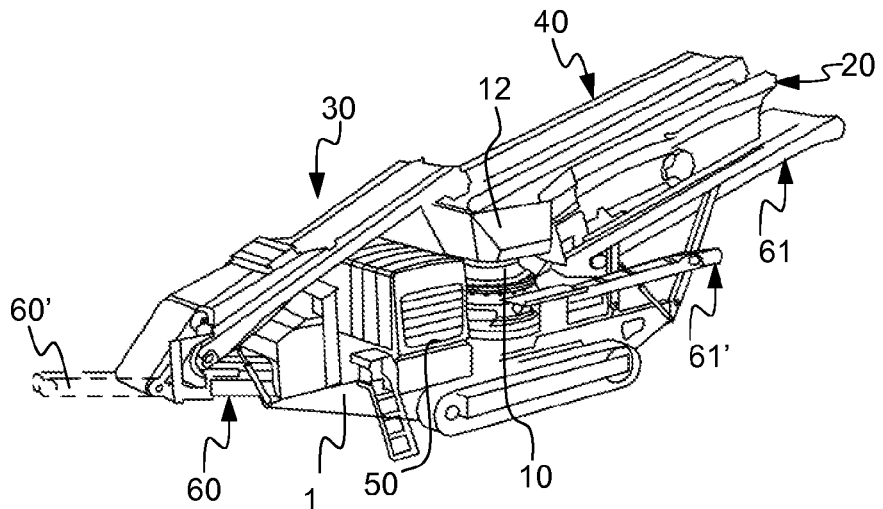
FIG. 3 shows a perspective view of the processing plant of FIG. 1.

A mineral material processing plant 100 shown in FIGS. 1-3 comprises a frame 1 and a crusher 10 fixed to the frame, a motor module 50, a motor 51, a main conveyor 60, a first conveyor 30, a second conveyor 40, a screen 20 and a discharge conveyor 61. The frame 1 comprises in this embodiment further a track base for moving the processing plant. The crusher or the screen, or both simultaneously can be operated in the processing plant 100 as the processing apparatus.

The first conveyor 30 and the second conveyor 40 are in an operation position during crushing and screening in FIG. 1. The first conveyor 30 feeds the screen 20 via the second conveyor 40, and the overs of the screen moves from the uppermost screen deck into a feed hopper 12 of the crusher 10. Material dropping through the screen moves outside the plant 100 at least by the discharge conveyor 61 which is below the screen. The overs of possible below screen decks 22, 23 (FIG. 9) etc. move outside the plant by discharge conveyors 61' (FIG. 3) corresponding to the screen decks. Crushable and/or screenable material is brought from outside to the plant 100 into a feed hopper 34 of the first conveyor 30 or directly into the feed hopper 12 of the crusher or in both 12, 34. In FIG. 1 the crushed material moves from the crusher 10 to the main conveyor 60 which moves the material to the first conveyor 30.

The first conveyor 30 and the second conveyor 40 which are movable independently from each other form functionally successively connected a feed conveyor for the screen which feed conveyor passes over the motor module and the screen in the middle of the plant 100. Both conveyors 30, 40 can be moved mainly on different sides of a highest point of the plant formed by the crusher.

In sole crushing operation the screen can be passed by by moving the second conveyor 40 away from a feed connection of the first conveyor 30. Then the first conveyor can feed directly the crusher 10. Alternatively or additionally, the material to be crushed is fed from outside the plant 100 directly to the feed hopper 12 of the crusher. In sole crushing operation without the screen the crushed material can be moved by the main conveyor 60 outside the plant by interrupting a feed connection between the main conveyor 60 and the first conveyor 30. That can be implemented for example by controlling the main crusher to discharge the crushed material directly outside the plant 100 instead of the first conveyor 30 what is illustrated with regard to the main crusher 60 by a dashed line region 60 shown in FIG. 3.

The first conveyor 30 feeding the crusher 10 acting as a processing apparatus pivotes due to a pivot 33 to transport, operation and service positions. The first conveyor comprises a first material transport part 31 and a second material transport part 32 and the pivot 33 by which the second material transport part is fixed pivotably in relation to the first material transport part.

Figure 9:
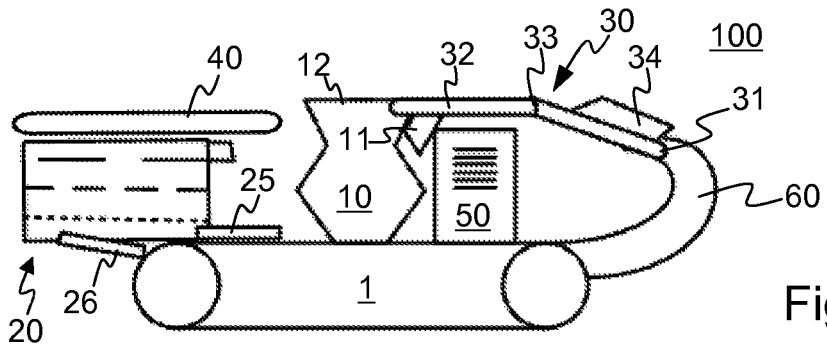

A starting end of the first conveyor 30 i.e. the first material transport part 31 is fixedly mounted to the plant and an end of the first conveyor i.e. the second material transport part 32 pivots in the transport position above the motor module 50 in horizontal position and so fits in the transport height (FIGS. 2 and 9).

According to a preferable embodiment the first conveyor 30 comprises an endless transport member such as a belt which forms a continuing transport surface over the first material transport part 31 and the second material transport part 32. Preferably the second conveyor 40 comprises an endless transport member such as a belt.

According to another preferable embodiment the first conveyor 30 comprises a first endless transport member such as a first belt in the first material transport part 31 and a second endless transport member such as a second belt in the second material transport part 32 which are forming successive transport surfaces over the first conveyor.

A highest point of the crusher 10 is defined by the feed hopper 12 which is fixed to the crusher or integrated fixedly to an upper frame of the crusher, the feed hopper comprising an open pivotable side 11 at the second material transport part 32 of the first conveyor 30.

According to some preferable embodiments the first conveyor 30 comprises a dust cover (not shown) which is formed above the first 31 and second 32 material transport parts and is foldable at the pivot 33 and preferably forms a uniform dust shielding above the transport surface of the first conveyor. According to some preferable embodiments the second conveyor 40 comprises a dust cover (not shown) which forms a substantially uniform dust shielding above a transport surface of the second conveyor.

The second conveyor 40 is fixed to a sub-frame 27 of the screen 20 and moves at least part of the way to the transport position with the screen. The screen 20 is fixed preferably in a flexible way to the sub-frame 27. A screen assembly 20, 27 formed by the screen and the sub-frame is supported to the frame 1 of the plant by first support arms 25 and second support arms 26 which form first four-bar linkages together with the frame 1 and the sub-frame 27. When the screen is moved to the transport position the screen moves both forward and downwards. Further the inclination of the screen in relation to the horizontal can change if necessary when the four-bar linkage is dimensioned in a desired way. The first four-bar linkages are moved preferably by hydraulic cylinders 28 which act in the examples of the figures between the support arms 25 and the frame 1.

It is useful that the conveyor above the screen can be moved to compensate a distance between the conveyor and the crusher when the inclination of the screen in relation to the horizontal is changed. Then distances of horizontal and vertical planes between the screen and the crusher change wherein the conveyor can be re-positioned that the distance to the previous feed conveyor remains preferred.

The first four-bar linkage 25, 26, 27, 1 is locked to an upper position for the time of the operation. A locking 29 receives load during screening and makes the operation of the plant safe. Preferably the locking is implemented by reaction bars 29 such as turnbuckles which are adjustable in length. In the upper position of the first four-bar linkage, the turnbuckle 29 is mounted between the support arm 25 and the frame 1 and adjusted to have a suitable length, for example to a desired pretensioning. An example of the fixing of the turnbuckle is fixing of loops at the ends of the turnbuckle by pins to fixing holes in the support arm 25 and the frame 1. The cylinders 28 can be protected by the locking against the load during the operation which occurs for example due to uneven distribution of the material in the screen assembly and the vibrating screening movement of the screen.

The second conveyor 40 is preferably mounted above the screen 20. The pivoted third support arms 41 and fourth support arms 42 support the second conveyor. The pivoted support arms 41, 42 are preferably arranged in pairs at the side of the second conveyor and the screen and form the second four-bar linkage mechanism together with the sub-frame 27 and the second conveyor 40. The second four-bar linkages can be moved by one controllable movement actuator such as a hydraulic cylinder pair 43 which act in the examples of the figures between the support arms 41 and the sub-frame 27, and complex conveyor movement mechanisms with many cylinders can be avoided. The second conveyor can be lowered by these support arms 41, 42 in the transport position as close as possible to the screen so minimizing the transport height.

The second four-bar linkage mechanism comprises as a locking a pin-hole-combination where the pin is mountable in holes which are formed to the support arm 41, 42 and the sub-frame 27. In the example of FIGS. 1 and 2 a hydraulic cylinder 43 moves the third support arm 41 and the pin-hole locking is arranged to the fourth support arm 42.

The discharge conveyor 61 is fixed to the sub-frame 27 at a first end 62 of the discharge conveyor, preferably in a fixed manner below the screen 20 close to a fixing point of the support arm 25. The discharge conveyor 61 is fixed to the sub-frame 27 also at a second point, preferably in a fixed manner below the screen 20 (longitudinally in the centre region of the screen) at a conveyor pivot 63 which is formed at the centre region of the screen. A discharge end 64 of the discharge conveyor 61 is distance adjustable with regard to the sub-frame 27 due to the conveyor pivot. The discharge end 64 is supported in the operation position to the sub-frame 27 (an extension of the sub-frame) by a support 65 which defines a maximum distance of the discharge end from the sub-frame and further allows moving of the discharge end towards the sub-frame and the screen. The adjustment of the position of the discharge end is preferred because for example when adjusting the inclination of the screen one may also like to change the position of the discharge conveyor optimal.

Alternatively or additionally to the foresaid the discharge conveyor 61 can be pivoted at its bottom end to the pivot of an upper end of the support arm 25.

Preferably the support is a chain 65 but it can also be another elongated member such as a wire or an actuator with changeable length such as a hydraulic cylinder. In the transport position the discharge end 64 relies on the support arm 26 of the frame, preferably on a support structure 26' between parallel support arms 26. When the screen assembly is lowered with the linkage arm mechanism downwards, the discharge end 64 of the discharge conveyor relies on the support structure 26' and the discharge end 64 moves closer towards the screen. A gap between the discharge conveyor 61 and the screen 20 opens when the screen is raised.

In FIG. 2 the first conveyor 30 in the processing plant 100 is in the transport position pivoted to a second position (downwards). The second conveyor 40 is lowered from the position of the FIG. 1 further downwards closer towards an uppermost screen deck of the screen, preferably in between sides located at the sides of the screen, wherein the second conveyor 40 is also in the transport position. The discharge end 32' of the second material transport part 32 of the first conveyor 30 is lowered, through an opening which is formed by an open pivoted side 11 of the feed hopper 12 of the crusher 10, in between the sides of the feed hopper, preferably on the crusher and preferably the second material transport part 32 is arranged perpendicularly in relation to a vertical axis of the crusher. Then, the highest points of the first conveyor 30 and the second conveyor 40 are in such a height which substantially does not exceed the height defined by the highest point of the processing apparatus. In case of FIG. 2 the highest point, that is the transport height, of the plant 100 is defined by the side of the feed hopper of the crusher.

Figure 4:
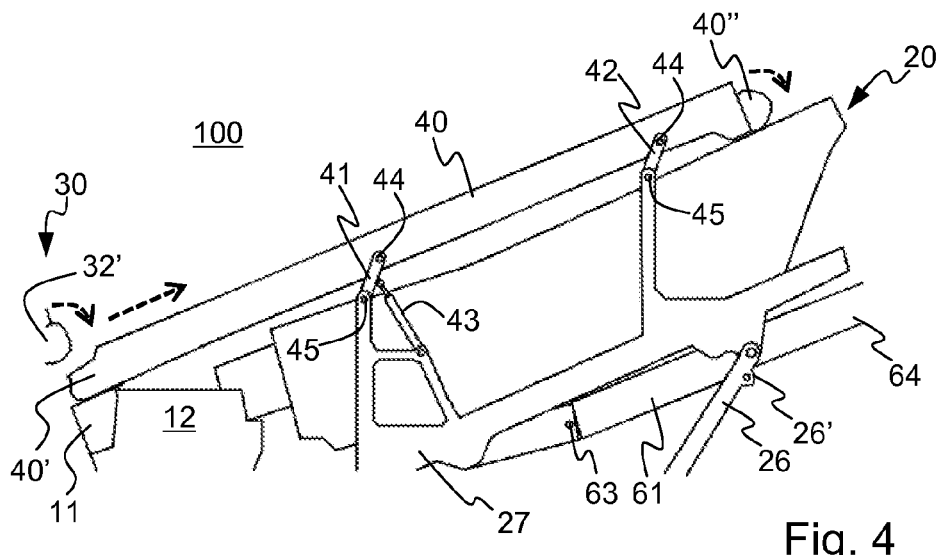
FIG. 4 shows a conveyor above a screen of the processing plant of FIG. 1 in a first position feeding the screen.
Figure 5:
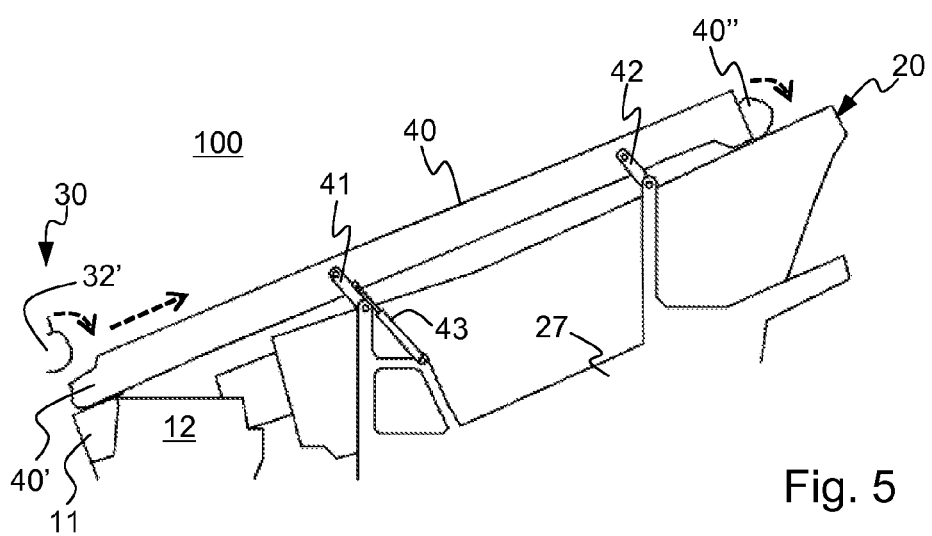
FIG. 5 shows the conveyor above the screen of the processing plant of FIG. 1 in a second position feeding the screen.
Figure 6:
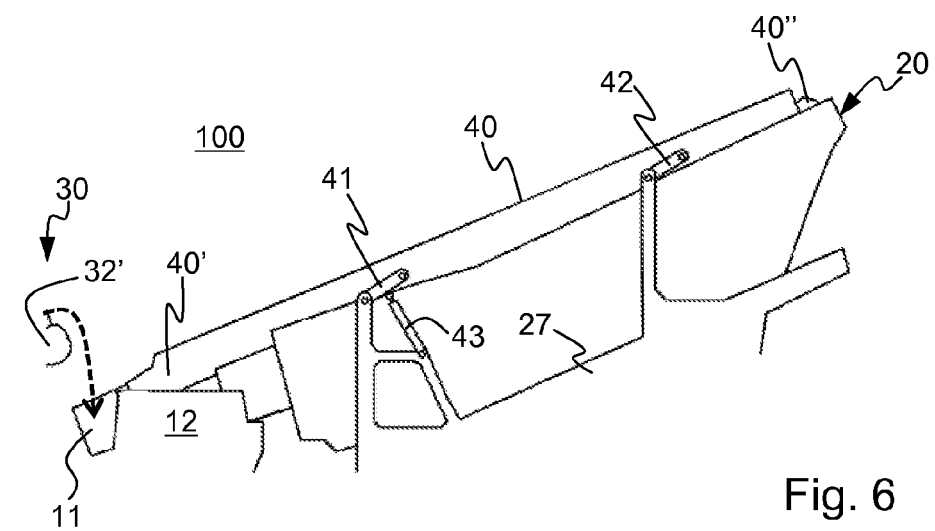
FIG. 6 shows the conveyor above the screen of the processing plant of FIG. 1 in a third position.

FIGS. 4-6 show the second conveyor 40 above the screen 20 in different positions. A material flow is illustrated by dashed arrows.

FIG. 4 shows the second conveyor 40 in an operation position according to a first embodiment. In FIG. 4 the second conveyor 40 feeds the screen 20 as in FIG. 1. The discharge end 32' of the second material transport part of the first conveyor 30 feeds material to the second conveyor 40. When compared to the highest position of the second conveyor where the second conveyor is located at a maximum distance from the screen, the support arms 41, 42 are pivoted in same direction as in the transport position shown in FIG. 6. The movement distance of the hydraulic cylinders 43 to the transport position is shorter from this position of the support arms than from the position of FIG. 4.

The third support arm 41 and the fourth support arm 42 are fixed at a distance from each other and pivotably at third pivot points 44 in connection with the conveyor 40 above the screen and pivotably at fourth pivot points 45 in connection with the screen (via the sub-frame 27) forming a movable four-bar linkage mechanism.

The second conveyor can be raised by the support arm mechanism 41, 42, 43 higher than the operation position for service such as replacement of the screen meshes. The highest position (not shown in the figures) of the second conveyor may also be called service or maintenance position.

FIG. 5 shows the second conveyor 40 in an operation position according to a second embodiment. FIG. 5 shows an alternative arrangement of the four-bar linkage mechanism above the screen where the second conveyor 40 and the screen 20 are functionally connected successively such as in FIG. 4. The support arms 41, 42 are in the operation position of the second conveyor 40 pivoted in the opposite direction than in FIG. 4 compared to the highest position of the second conveyor. Due to the placement of the support arms 41, 42 and the hydraulic cylinder 43 shown in FIG. 5 the movement length of the second conveyor above the screen is gotten longer than in FIG. 4, wherein the second conveyor 40 can easier be moved away from a feed distance of the first conveyor 30 by the sole movement of the second conveyor without moving the screen. In a case where the inclination of the screen is changed the location of the above conveyor 40 in relation to the preceding conveyor 30 can be changed, if necessary.

In FIG. 6 the material to be conveyed is arranged to be fed via the discharge end 32' of the second material transport part directly to the crusher 10. The second conveyor 40 is moved away from the feed distance of the first conveyor 30 and downwards against the screen 20 when the support arms 41, 42 are pivoted, viewed in the viewing direction of FIG. 6, clockwise by retracting the hydraulic cylinders 43. The position of the second conveyor in relation to the screen shown in FIG. 6 enables achieving the transport height of the plant 100 without dismounting the second conveyor when the screen assembly 20, 27 is lowered to a bottom position on the frame 1.

In the processing plant 100 of FIGS. 7-10 the screen 20 is illustrated as a multilayer or multideck screen which comprises a first screen deck 21 and a desired number underneath screen decks such as a second screen deck 22 and a third screen deck 23. The screen is supported to the frame by pivoted support arms 25, 26 which form a four-bar linkage together with the screen and the frame.

Figure 7:
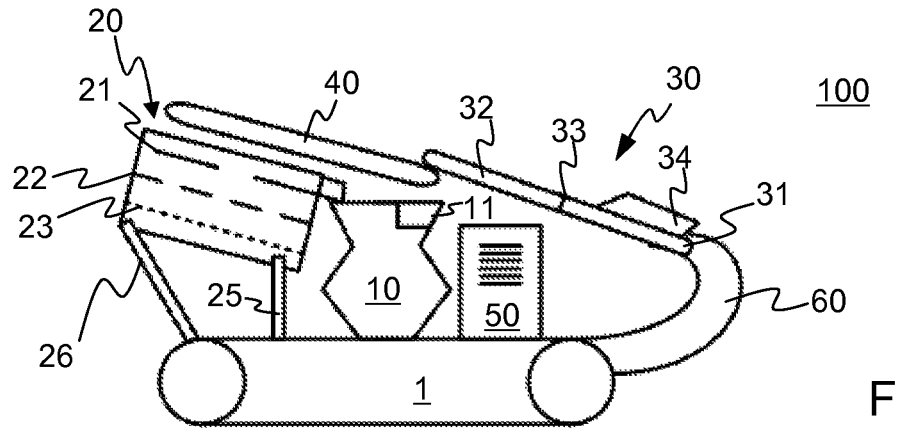
FIGS. 7-10 show the processing plant of FIG. 1 in different positions of the conveyors.

In FIG. 7 the first conveyor 30 and the second conveyor 40 are during the screening and the crushing in the same operation position as in FIG. 1. The overs of the uppermost screen deck 21 is guided from the screen to the crusher. The screen 20 comprises support arms 25, 26 to move the screen and the second conveyor 40 to the operation position and away from the operation position.

Figure 8:
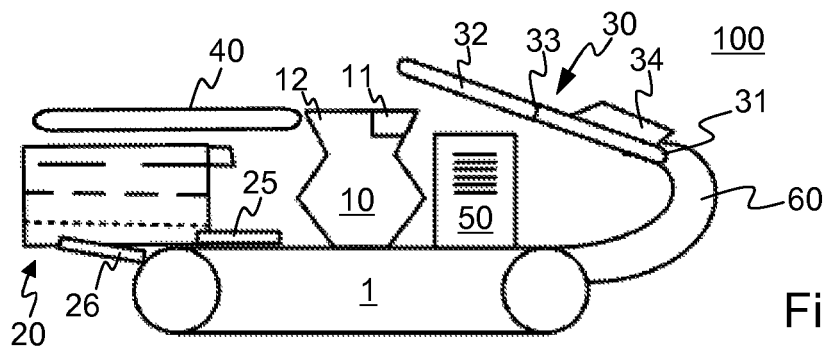

In FIG. 8 the first conveyor 30 of the processing plant 100 is in the operation position feeding directly the crusher 10. The screen 20 is not operated during the crushing in the position of FIG. 8. The screen 20 and the second conveyor 40 are moved away from the operation position by the support arms 25, 26 and supported by the support arms which are pivotable in the longitudinal direction of the plant 100, and lowered closer to the frame 1 of the plant. The second conveyor 40 is moved away from the feeding connection of the first conveyor 30 by the movement of the linkage mechanism 25, 26 which is supporting the screen. Preferably the starting end of the second conveyor 40 is moved to the other side of the crusher than the first conveyor when viewed in the longitudinal direction of the plant, wherein the screen can be serviced while the conveyor 40 is still in the operation position with regard to the screen 20 or moved even higher than the operation position supported by the support arms 41, 42.

In FIG. 9 the first conveyor 30 of the processing plant 100 is in the transport position pivoted to the second position (horizontal position). The second conveyor 40 is also in the transport position. The discharge end of the second material transport part 32 is lowered, through an opening which is formed by an open pivoted side 11 of the feed hopper of the crusher 10, in between the sides of the feed hopper, preferably on the crusher. Then, the highest points of the first conveyor 30 and the second conveyor 40 are in a height which substantially does not exceed the height defined by the highest point of the processing apparatus.

Figure 10:
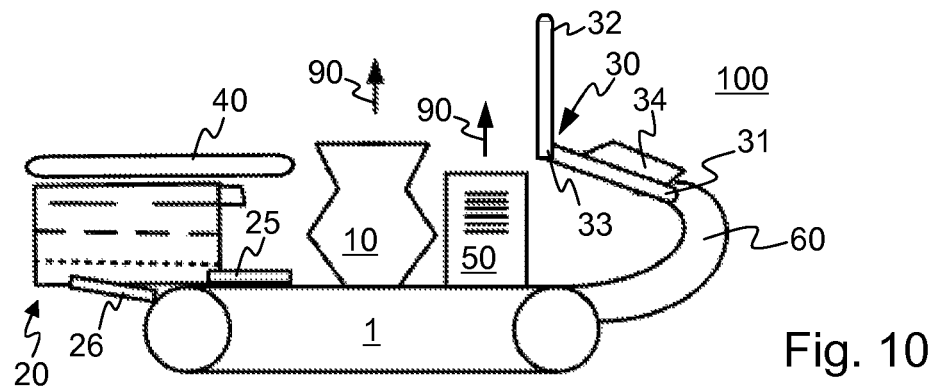

In FIG. 10 the discharge end of the second material transport part 32 is pivoted from the position of FIG. 8 to an opposite pivoting direction in relation to the first position (preferably vertically upwards) for example for service. In this third position the projection of the discharge end of the second material transport part is arranged to leave free the lifting centres of the crusher 10 and the motor module 50 when viewed from above. A lifting apparatus 90 such as a lifting rope and a gripping member do not hit the second material transport part 32 during lifting of the motor module 50. The third position enables the lifting, for example in connection with the service, of the crusher, a wear part of the crusher or the motor module without having to remove from place or detach the first conveyor 30. Preferably in the third position the projection of the discharge end when viewed from above does not meet the projection of the processing apparatus or the motor module, or is arranged to leave free the projection of the processing apparatus/motor module. Preferably, when the processing apparatus/motor module or a part thereof is lifted from a centre/gravity centre, a lifting space is freed up for a lifting wire at least at the gravity centre of the processing apparatus. Also the second conveyor 40 is moved on the screen farther from the crusher 10 (such as in FIG. 9) allowing service and lifting.

The processing plants presented above may also be entirely or partly wheel based or movable on legs instead of the track base. Alternatively the processing plant may be movable/towable for example by a truck or another external power source. Further to the above presented the processing plant may also be a stationary processing plant.

Preferably there are one to four superimposed screen decks in the screen but there may be even more screen decks.

Also other types of actuators with changeable length may be used instead of the hydraulic actuator and the hydraulic cylinder such as electric cylinders or a worm screw.

The foregoing description provides non-limiting examples of some embodiments of the invention. It is clear to a person skilled in the art that the invention is not restricted to details presented, but that the invention can be implemented in other equivalent means.

Some of the features of the above-disclosed embodiments may be used to advantage without the use of other features. As such, the foregoing description shall be considered as merely illustrative of principles of the invention, and not in limitation thereof. Hence, the scope of the invention is only restricted by the appended patent claims.

The invention claimed is:

1. A mineral material processing plant comprising:
    a frame;
    a screen which is supported on the frame; and
    a conveyor positioned above the screen which conveyor is fixed in connection with the screen for transporting material to be processed by the screen,
    wherein the support of the screen on the frame includes a first support arm and a second support arm fixed at a distance from each other and pivotably at first pivot points in connection with the screen and pivotably at second pivot points in connection with the frame, forming a movable first four-bar linkage mechanism; and the support of the conveyor comprises a third support arm and a fourth support arm fixed at a distance from each other and pivotably at third pivot points in connection with the conveyor above the screen and pivotably at fourth pivot points in connection with the screen, forming a movable second four-bar linkage mechanism, wherein the conveyor is arranged to be moved farther from the screen, so as to reduce the transport height of the mineral material processing plant, and closer to the screen by the movement of the second four-bar linkage.

2. The processing plant according to claim 1, comprising a discharge conveyor below the screen which discharge conveyor is supported at its first end in connection with the screen; and the discharge conveyor comprises a conveyor pivot at the centre region of the screen; and the discharge conveyor is supported at the conveyor pivot in connection with the screen; and the discharge conveyor comprises a discharge end which is pivotable around the conveyor pivot closer to and farther from the screen, and the discharge end is arranged to move farther from the screen and closer to the screen through a support structure which is formed to the support arm of the first four-bar linkage mechanism.

3. The processing plant according to claim 1, comprising a discharge conveyor below the screen which discharge conveyor is supported at its first end in connection with the screen; and the discharge conveyor comprises a conveyor pivot at said first end; and the discharge conveyor is supported at the conveyor pivot in connection with the screen; and the discharge conveyor comprises a discharge end which is pivotable around the conveyor pivot closer to and farther from the screen, and the discharge end is arranged to move farther from the screen and closer to the screen through a support structure which is formed to the support arm of the first four-bar linkage mechanism.

4. The processing plant according to claim 1, wherein the second four-bar linkage mechanism further comprises a controllable actuator which is configured to decrease an area formed by the pivot points of the second four-bar linkage mechanism therebetween to move the conveyor closer to the screen and to increase the area formed by the pivot points therebetween to move said conveyor farther from the screen.

5. The processing plant according to claim 1, wherein the location of the conveyor in the position closest to the screen, provided by the movement of the second four-bar linkage mechanism, is a transport position of the conveyor.

6. The processing plant according to claim 1, wherein the first four-bar linkage mechanism comprises an adjustable reaction bar for locking a turnbuckle mounted between the support arm and the frame in an upper position of the first four-bar linkage.

7. The processing plant according to claim 1, wherein the second four-bar linkage mechanism comprises as a locking a pin-hole-combination where the pin is mountable in holes which are formed to the support arm and a sub-frame which is operating as a fixing base of the screen.

8. The processing plant according to claim 1, wherein the second four-bar linkage mechanism is positioned at both longitudinal sides of the screen and includes a controllable actuator belonging to said second four-bar linkage mechanism, wherein the controllable actuator is an expandable and retractable hydraulic cylinder.

9. The processing plant according to claim 1, further comprising a crusher and a first conveyor, and the conveyor above the screen is feedable above the crusher by the first conveyor.

10. The processing plant according to claim 1, wherein the conveyor arranged above the screen is arranged to move in the longitudinal direction of the screen by the movement of the second four-bar linkage mechanism.

11. The processing plant according to claim 10, wherein the processing plant is configured to feed the crusher by the first conveyor when the conveyor above the screen is moved in the longitudinal direction of the screen away from a feed connection of the first conveyor.

12. The processing plant according to claim 9, wherein the crusher comprises a feed hopper of the crusher which feed hopper comprises an open pivotable side, and a discharge end of the first conveyor is located in a transport position in between sides of the feed hopper via the open pivotable side.

13. The processing plant according to claim 1, wherein the mineral material processing plant is a movable screening and crushing plant.

14. A method for operating a mineral material processing plant which processing plant comprises a frame and a screen which is supported on the frame, comprising the steps of:
positioning a conveyor above the screen which conveyor is fixed in connection with the screen for transporting material to be processed by the screen;
forming a movable first four-bar linkage mechanism to support the screen on the frame including a first support arm and a second support arm fixed at a distance from each other and pivotably at first pivot points in connection with the screen and pivotably at second pivot points in connection with the frame;
forming a movable second four-bar linkage mechanism to support the conveyor relative to the screen including a third support arm and a fourth support arm fixed at a distance from each other and pivotably at third pivot points in connection with the conveyor above the screen and pivotably at fourth pivot points in connection with the screen; and
moving the conveyor farther from the screen and closer to the screen, so as to reduce the transport height of the mineral material processing plant, by the movement of the second four-bar linkage.

15. The method according to claim 14, wherein the processing plant comprises a discharge conveyor below the screen which discharge conveyor is supported at its first end in connection with the screen; and the discharge conveyor comprises a conveyor pivot at the centre region of the screen; and the discharge conveyor is supported at the conveyor pivot in connection with the screen; and the discharge conveyor comprises a discharge end which is pivotable around the conveyor pivot closer to and farther from the screen, and the discharge end is arranged to move farther from the screen and closer to the screen through a support structure which is formed to the support arm of the first four-bar linkage mechanism.

16. The method according to claim 14, wherein the processing plant comprises a discharge conveyor below the screen which discharge conveyor is supported at its first end in connection with the screen; and the discharge conveyor comprises a conveyor pivot at said first end; and the discharge conveyor is supported at the conveyor pivot in connection with the screen; and the discharge conveyor comprises a discharge end which is pivotable around the conveyor pivot closer to and farther from the screen, and the discharge end is arranged to move farther from the screen and closer to the screen through a support structure which is formed to the support arm of the first four-bar linkage mechanism.

17. The method according to claim 14, wherein the second four-bar linkage further comprises a controllable actuator by which an area formed by the pivot points of the second four-bar linkage mechanism therebetween is decreased wherein the conveyor moves closer to the screen to a transport position; and by which the area formed by the pivot points therebetween is increased wherein said conveyor moves farther from the screen to an operation position.

18. The method according to claim 14, wherein the processing plant further comprises a crusher and a first conveyor; and feeding, above the crusher, the conveyor above the screen by the first conveyor.

19. The method according to claim 14, comprising moving the conveyor arranged above the screen in the longitudinal direction of the screen by moving the second four-bar linkage mechanism.

20. The method according to claim 18, comprising moving the conveyor arranged above the screen in the longitudinal direction of the screen away from a feed connection of the first conveyor; and feeding the crusher by the first conveyor.

* * * * *

UNITED STATES PATENT AND TRADEMARK OFFICE
CERTIFICATE OF CORRECTION

| | |
|---|---|
| PATENT NO. | : 9,586,764 B2 |
| APPLICATION NO. | : 14/237411 |
| DATED | : March 7, 2017 |
| INVENTOR(S) | : Vesa-Matti Salminen and Iiro Nikkila |

It is certified that error appears in the above-identified patent and that said Letters Patent is hereby corrected as shown below:

In the Claims

In Claim 1, at Column 10, Line 60: the word "farther" should instead read --closer--.

In Claim 1, at Column 10, Line 62: the word "closer" should instead read --farther--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*